June 3, 1924.
P. H. WADDILL
1,496,693
TEMPORARY SEAT FOR AUTOMOBILE TRUCKS
Filed Oct. 1, 1923
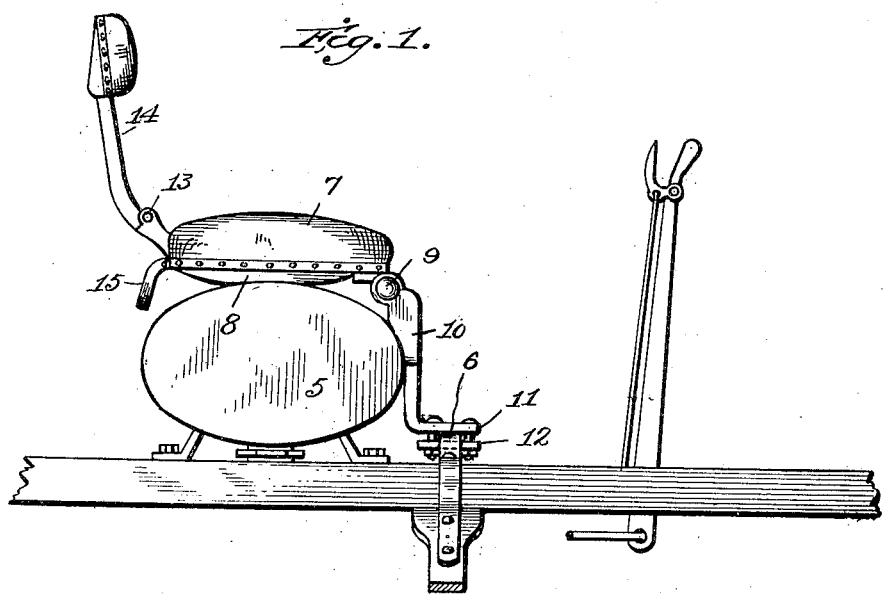
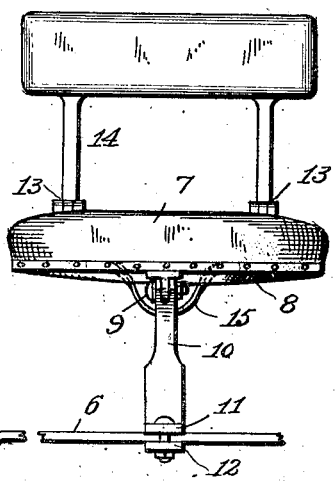
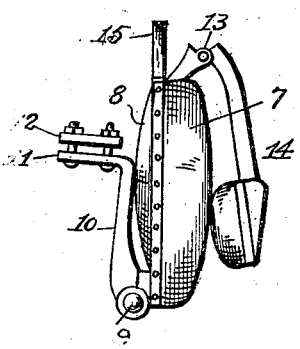
Inventor
Paul H. Waddill
By Davis & Davis Patented June 3, 1924.

1,496,693

UNITED STATES PATENT OFFICE.

PAUL H. WADDILL, OF LAURINBURG, NORTH CAROLINA.

TEMPORARY SEAT FOR AUTOMOBILE TRUCKS.

Application filed October 1, 1923. Serial No. 665,979.

*To all whom it may concern:*

Be it known that I, PAUL H. WADDILL, a citizen of the United States of America, and a resident of Laurinburg, county of Scotland, and State of North Carolina, have invented certain new and useful Improvements in Temporary Seats for Automobile Trucks, of which the following is a full and clear specification.

The practice in distributing Ford automobile trucks is to ship them minus the seat, so that the local distributors are compelled to drive the trucks from the freight stations to their sale and assembly plants without seats. The usual custom is for the driver to sit on the gasoline tank, but this is uncomfortable and is quite wearying in comparatively long trips. It is also dangerous, especially in traffic and where the going is rough. It is the object of my invention to provide a simple seat that may be temporarily attached to a truck and which, when detached therefrom, may be folded up and carried about in a manner similar to a piece of hand baggage, as more fully hereinafter set forth.

In the drawing—

Fig. 1 is a side elevation of my device in position for use, a sufficient portion of a Ford truck being shown to illustrate the manner of using it;

Fig. 2 is a front elevation of the same;

Fig. 3 is a side elevation showing the seat folded.

In the drawing annexed, 5 designates the usual gasoline tank on a Ford automobile truck, and 6 designates a strap or tie-rod that extends across the frame in all Ford trucks, the position of this tie-rod being immediately in front of the gasoline tank. A cushion seat frame 7 is provided on its under side with a cushion 8 which is adapted to rest upon the gasoline tank, this cushion 8 being provided to prevent injuring the tank. Attached to the front edge of the seat frame 7 by a horizontal pivot 9 is a post 10 whose lower end is adapted to be attached to the aforesaid tie-rod 6. Any simple way of attaching this pedestal to the tie-rod may be used; I show a simple form of clamp consisting of a forwardly-projecting end 11 of the pedestal, a plate 12 and a pair of bolts connecting parts 11 and 12.

Attached to the rear edge of the seat frame 7 by a horizontal pivot 13 is a back-rest 14. When the seat is in position, it will be seen that the cushion seat member 7 rests upon the top of the tank, and the rear edge of the pedestal rests against the front side of the tank, this rear edge of the pedestal being curved to fit the tank. When the seat is detached, the post and the back-rest may be folded against the opposite sides of the seat member 7. For conveniently carrying the seat to the freight station or other place of delivery of the truck chassis, I provide a leather handle 15, the same being attached to the rear edge of the seat member 7. It will be understood that the lower end of the pedestal may be provided with means for attaching and supporting the pedestal upon any other member of the chassis, if desired.

It is obviously important to have a back-rest on a seat of this character, since a back-rest is needed by most drivers in order to form an abutment to press against in operating the pedals; and in order to hold the back-rest rigid, it is important that the joint at 13 shall be of the rule joint type. It will be apparent also that the bulk of the weight of the driver is upon the fuel tank and that the post 10 serves principally to anchor the seat against lateral shifting. The free pivoting of the seat 7 to the post 10 is advantageous not only because, as stated, it enables the parts to be folded into compact relation for convenient carrying, but also because it gives the seat a certain amount of resiliency due to the use of the under cushion 8. It is also desirable that the pedestal shall abut solidly against the front edge of the fuel tank, so as to thereby prevent the seat from being dislodged backwardly under the severe strains due to the pressure on the pedals.

Instead of using my seat merely when the chassis are driven from the freight stations to the purchasers' retail stores and assembly plants, it is obvious that these seats will be capable of use by contractors and others who make such use of Ford truck chassis as does not require or warrant the erection thereon of cabs.

What I claim is:

1. A movable temporary seat for Ford automobiles consisting of a seat frame provided with a seat-cushion on its upper side and a buffer cushion on its under side, a back-rest pivotally connected to the rear side of the seat frame, and an anchoring post having a free pivotal connection to the front edge of the seat frame, the lower end of the anchoring post being provided with means for detachably anchoring it to a member of the chassis frame, said buffer-cushion being adapted to rest upon the fuel-tank of the automobile.

2. In a temporary seat for a Ford chassis, a seat frame having a seat-cushion on its upper side and a buffer-cushion on its under side and a back-rest pivotally attached to its rear edge, and an anchoring post provided with means at its lower end for detachably anchoring it to the chassis frame and having a free pivotal connection at its upper end to the front edge of the seat frame, the rear face of said anchoring post being concaved to fit against the front face of the fuel tank on the chassis, said buffer-cushion being adapted to rest upon the fuel-tank mounted on the chassis.

3. In a seat of the character described, a seat member adapted to rest upon the top of the fuel tank, a back-rest attached thereto, and an anchoring post attached to the front edge of the seat member by a pivotal joint and provided at its lower end with means for rigidly but detachably attaching it to the chassis frame, said anchoring post member having its rear edge shaped to bear against the front face of the fuel tank.

In testimony whereof I hereunto affix my signature.

PAUL H. WADDILL.